(12) United States Patent
Muldoon et al.

(10) Patent No.: US 11,867,075 B2
(45) Date of Patent: Jan. 9, 2024

(54) RADIAL OUTWARD BEARING SUPPORT FOR A ROTATING STRUCTURE OF A TURBINE ENGINE

(71) Applicant: Raytheon Technologies Corporation, Farmington, CT (US)

(72) Inventors: Marc J. Muldoon, Marlborough, CT (US); Russell B. Witlicki, Wethersfield, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 17/967,369

(22) Filed: Oct. 17, 2022

(65) Prior Publication Data
US 2023/0220785 A1   Jul. 13, 2023

Related U.S. Application Data

(60) Provisional application No. 63/256,345, filed on Oct. 15, 2021.

(51) Int. Cl.
*F01D 25/16* (2006.01)
*F01D 25/06* (2006.01)

(52) U.S. Cl.
CPC ........ *F01D 25/06* (2013.01); *F05D 2220/323* (2013.01); *F05D 2220/76* (2013.01); *F05D 2240/54* (2013.01)

(58) Field of Classification Search
CPC ............... F01D 25/16; F05D 2220/323; F05D 2220/76; F05D 2240/54
See application file for complete search history.

(56) References Cited

U.S. PATENT DOCUMENTS

| | | | | |
|---|---|---|---|---|
| 4,916,894 A | * | 4/1990 | Adamson | ................... F02K 3/04 |
| | | | | 416/171 |
| 7,493,754 B2 | * | 2/2009 | Moniz | ..................... F16D 1/101 |
| | | | | 60/268 |
| 9,018,821 B2 | | 4/2015 | Stiesdal | |
| 9,917,490 B2 | | 3/2018 | Lemmers | |
| 10,071,811 B2 | | 9/2018 | Kupiszewski | |
| 10,308,366 B2 | | 6/2019 | Kupiszewski | |
| 10,487,839 B2 | * | 11/2019 | Kupiszewski | ............ F01D 5/02 |
| 10,801,410 B2 | | 10/2020 | Roberge | |

(Continued)

FOREIGN PATENT DOCUMENTS

| | | |
|---|---|---|
| EP | 3544152 B1 | 10/2020 |
| WO | 2020084241 A1 | 4/2020 |

OTHER PUBLICATIONS

"American National Standard Design Manual for Enclosed Epicyclic Gear Drives", ANSI/AGMA 6023-A88, Nov. 1988.

(Continued)

*Primary Examiner* — Jesse S Bogue
(74) *Attorney, Agent, or Firm* — Getz Balich LLC

(57) ABSTRACT

An assembly is provided for a turbine engine. This turbine engine assembly includes a rotating structure, a stationary structure, a bearing and a gearbox. The rotating structure is configured to rotate about a rotational axis. The rotating structure includes a shaft and a bladed rotor connected to the shaft. The stationary structure circumscribes the rotating structure. The bearing rotatably mounts the shaft to the stationary structure. The gearbox is disposed radially inboard of the bearing.

20 Claims, 5 Drawing Sheets

(56) References Cited

U.S. PATENT DOCUMENTS

| | | | |
|---|---|---|---|
| 10,823,000 B2* | 11/2020 | Pankaj | F02K 3/04 |
| 10,914,194 B2* | 2/2021 | Pankaj | F01D 25/16 |
| 11,085,515 B2 | 8/2021 | Moniz | |
| 11,473,441 B2* | 10/2022 | van der Merwe | F04D 19/02 |
| 11,492,979 B2* | 11/2022 | Beck | F02C 7/36 |
| 2007/0087892 A1 | 4/2007 | Orlando | |
| 2011/0206498 A1 | 8/2011 | McCooey | |
| 2016/0333786 A1* | 11/2016 | Glynn | F02C 3/04 |
| 2019/0085715 A1* | 3/2019 | van der Merwe | F01D 1/24 |
| 2020/0063606 A1 | 2/2020 | Miller | |
| 2020/0340406 A1 | 10/2020 | Maljean | |
| 2021/0010382 A1 | 1/2021 | Davies | |
| 2021/0010383 A1 | 1/2021 | Bradley | |
| 2021/0010384 A1 | 1/2021 | Bradley | |
| 2021/0079850 A1 | 3/2021 | Davies | |
| 2022/0056813 A1* | 2/2022 | Kurvinkop | F01D 25/16 |

OTHER PUBLICATIONS

EP Search Report for EP Patent Application No. 22202020.8 dated Jul. 12, 2023.

* cited by examiner

RADIAL OUTWARD BEARING SUPPORT FOR A ROTATING STRUCTURE OF A TURBINE ENGINE

CROSS-REFERENCE TO RELATED APPLICATIONS

This application claims priority to U.S. Provisional Patent Application No. 63/256,345 filed Oct. 15, 2021, which is hereby incorporated herein by reference in its entirety.

BACKGROUND OF THE DISCLOSURE

1. Technical Field

This disclosure relates generally to a turbine engine and, more particularly, to a rotating structure for a turbine engine.

2. Background Information

A gas turbine engine may include an electric machine for providing mechanical power and/or electricity. The electric machine is typically connected to a gearbox outside of a fan or a core of the engine, where the gearbox is coupled with a rotor within the engine core via a tower shaft. Some efforts have been made to arrange the electric machine within the engine core to reduce overall size of the gas turbine engine. There is a need in the art, however, for structures and architectures which facilitate arrangement of the electric machine within the engine core.

SUMMARY OF THE DISCLOSURE

According to an aspect of the present disclosure, an assembly is provided for a turbine engine. This turbine engine assembly includes a rotating structure, a stationary structure, a bearing and a gearbox. The rotating structure is configured to rotate about a rotational axis. The rotating structure includes a shaft and a bladed rotor connected to the shaft. The stationary structure circumscribes the rotating structure. The bearing rotatably mounts the shaft to the stationary structure. The gearbox is disposed radially inboard of the bearing.

According to another aspect of the present disclosure, another assembly is provided for a turbine engine. This turbine engine assembly includes a rotating structure, a stationary structure, a bearing and an electric machine. The rotating structure is configured to rotate about a rotational axis. The rotating structure includes a shaft and a bladed rotor connected to the shaft. The stationary structure extends circumferentially about the rotating structure. The bearing rotatably mounts the shaft to the stationary structure. The electric machine system is disposed within a cavity of the shaft. The electric machine system includes a rotor and a stator.

According to still another aspect of the present disclosure, another assembly is provided for a turbine engine. This turbine engine assembly includes a rotating structure, a stationary structure and a bearing. The rotating structure is configured to rotate about a rotational axis. The rotating structure includes a shaft and a bladed rotor. The shaft includes a base, an extension and a land disposed at a distal end of the rotating structure. The extension is connected to the base and extends radially in an outward direction and axially in a first direction to the land. The bladed rotor is connected to the base. The stationary structure circumscribes the rotating structure. The bearing rotatably mounts the land to the stationary structure.

The extension may be configured as a conical section of the shaft. The land may be configured as a cylindrical section of the shaft.

The turbine engine assembly may also include a gearbox radially inboard of the rotating structure at the distal end of the rotating structure.

The electric machine system may also include a gearbox and an electric machine. The gearbox may be disposed within the cavity of the shaft. The electric machine may include the rotor and the stator.

The gearbox may couple the shaft to the rotor.

The bearing may axially overlap and may extend circumferentially around the gearbox.

The gearbox may be disposed within a cavity of the shaft.

The shaft may include a base, an extension and a land. The extension may project radially in an outward direction and axially in a first direction out from the base to the land. The bearing may rotatably mount the land to the stationary structure.

The land may axially overlap and may extend circumferentially about the gearbox.

The first direction may be an axially aft direction.

The extension may be configured as a conical section of the shaft.

The turbine engine assembly may also include an electric machine which include a rotor and a stator. The gearbox may couple the rotating structure to the rotor.

The electric machine may be configured as a motor during at least one mode of operation.

The electric machine may be configured as a generator during at least one mode of operation.

The turbine engine assembly may also include a compressor section, a combustor section, a turbine section and a flowpath extending sequentially through the compressor section, the combustor section and the turbine section. The gearbox and the electric machine may be radially inboard of the flowpath.

The bladed rotor may include a rotor disk and a plurality or rotor blades arranged circumferentially about and connected to the rotor disk. The rotor disk may be connected to the shaft.

The bladed rotor may be configured as a turbine rotor.

The rotating structure may also include a second bladed rotor connected to the shaft. The second bladed rotor may be configured as a compressor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
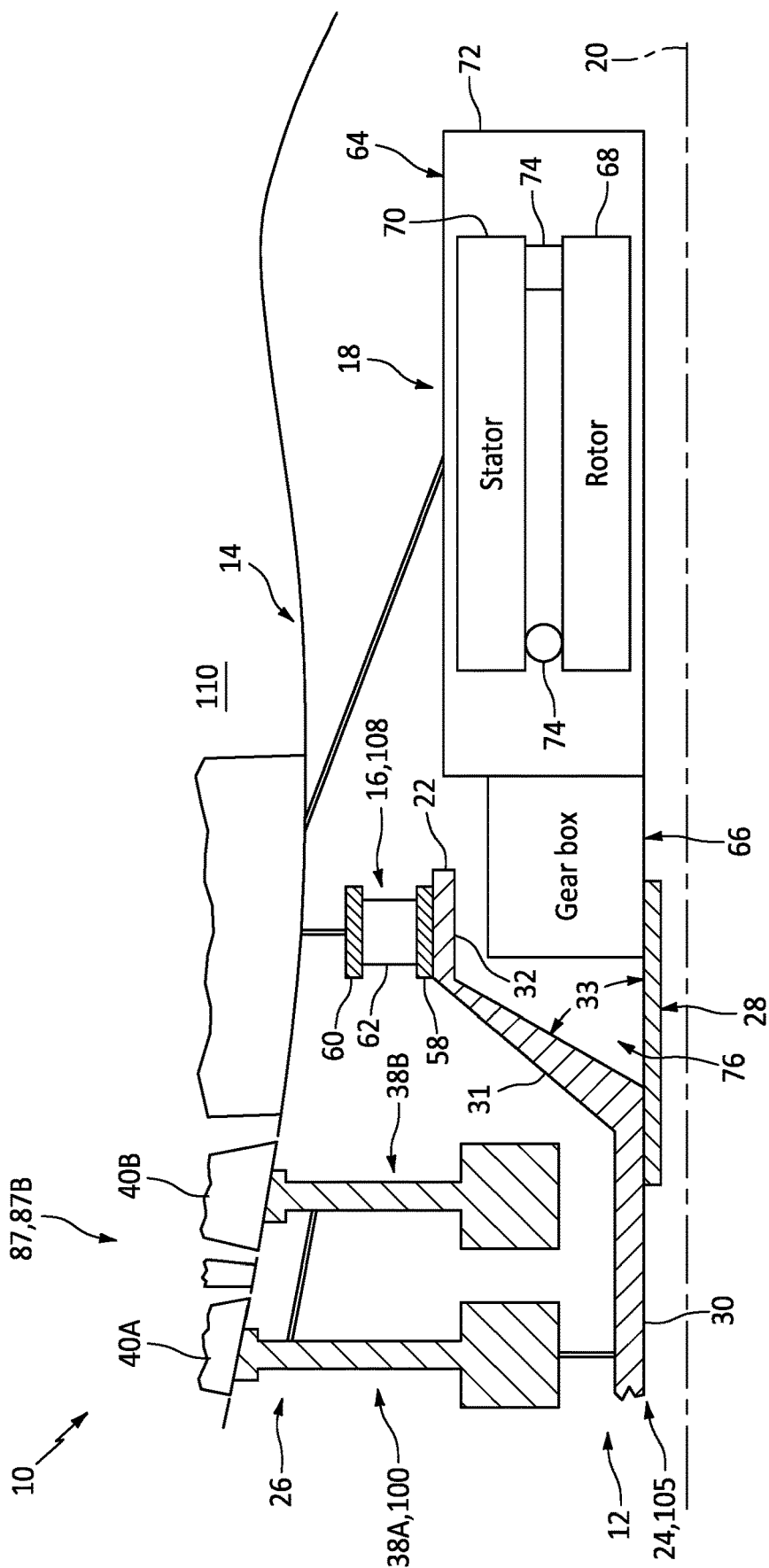
FIG. 1 is a partial sectional illustration of an assembly for a turbine engine.

FIG. 1 illustrates an assembly 10 for a turbine engine. This turbine engine assembly 10 includes a rotating structure 12, a stationary structure 14 and a rotating structure bearing 16 that rotatably mounts the rotating structure 12 to the stationary structure 14. The turbine engine assembly 10 of FIG. 1 also includes an electric machine system 18.

The rotating structure 12 extends axially along a rotational axis 20 to a distal end 22 of the rotating structure 12, which rotational axis 20 may be an axial centerline of the turbine engine assembly 10. The rotating structure 12 extends circumferentially around the rotational axis 20. The rotating structure 12 is rotatable about the rotational axis 20.

Figure 2:
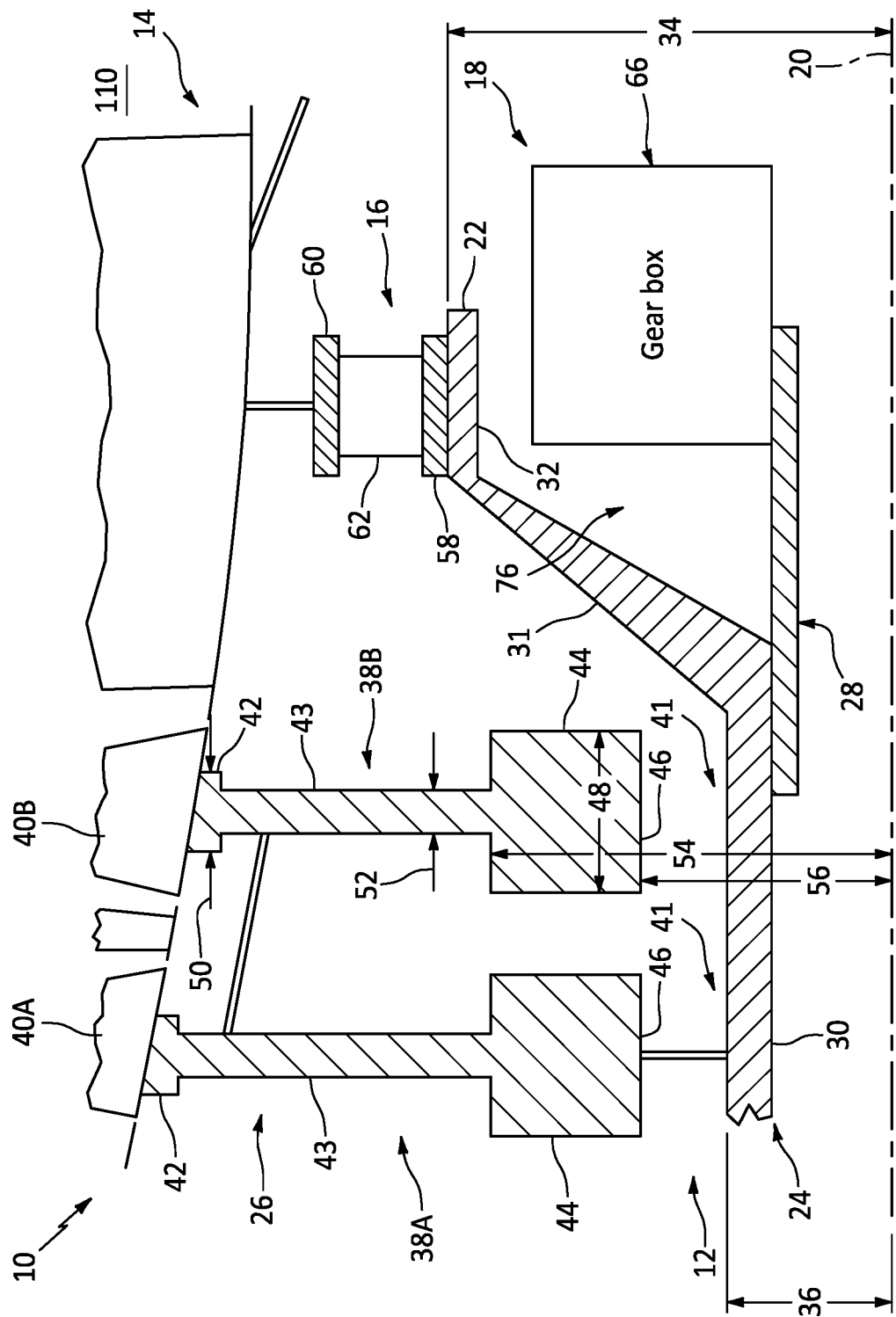
FIG. 2 is a partial sectional illustration of a portion of the turbine engine assembly.

Referring to FIG. 2, the rotating structure 12 includes a turbine engine shaft 24 and a turbine engine rotor 26. The rotating structure 12 of FIG. 2 also includes an electric machine system coupler 28; e.g., a gearbox coupler.

The turbine engine shaft 24 extends axially along the rotational axis 20 to (or about) the structure distal end 22. The turbine engine shaft 24 of FIG. 2 includes a tubular shaft base 30, a tubular shaft extension 31 and a tubular bearing land 32.

The shaft base 30 extends axially along the rotational axis 20 towards (e.g., to) the shaft extension 31. The shaft base 30 may be configured as a cylindrical section of the turbine engine shaft 24.

The shaft extension 31 is arranged between and is connected to the shaft base 30 and the bearing land 32. The shaft extension 31 of FIG. 2, for example, projects radially in a radial outward direction (e.g., away from the rotational axis 20) and axially in a first direction (e.g., aft; left-to-right along the rotational axis 20 in FIG. 2) away from (e.g., out from) the shaft base 30 towards (e.g., to) the bearing land 32. This shaft extension 31, for example, may be configured as a conical section of the turbine engine shaft 24. This conical section flares radially outward as the shaft extension 31 extends in the first direction away from (e.g., out from) the shaft base 30 and/or towards (e.g., to) the bearing land 32.

The shaft extension 31 of FIG. 1 is angularly offset from the shaft base 30 (and the rotational axis 20) by an angle 33; e.g., an acute angle. This angle 33 may be selected to increase turbine engine shaft stiffness while facilitating, for example, an axial forward position for the structure bearing 16. The angle 33 of FIG. 1, for example, is between forty degrees (40°) and fifty degrees (50°); e.g., forty-five degrees (45°). The present disclosure, however, is not limited to such an exemplary angle 33. For example, in other embodiments, the angle 33 may be greater than fifty degrees (50°) or less than forty degrees (40°).

The bearing land 32 is disposed at (e.g., on, adjacent or proximate) the structure distal end 22. The bearing land 32 of FIG. 2, for example, projects axially along the rotational axis 20 away from (e.g., out from) the shaft extension 31 to (or about) the structure distal end 22. The bearing land 32 may be configured as a cylindrical section of the turbine engine shaft 24.

The bearing land 32 of FIG. 2 has an outer radius 34 measured from the rotational axis 20 to an outer surface of the bearing land 32. This land outer radius 34 is sized greater than an outer radius 36 of the shaft base 30 measured from the rotational axis 20 to an outer surface of the shaft base 30. The land outer radius 34, for example, may be sized two times (2×) to five times (5×) greater than the base outer radius 36; e.g., two times (2×), three times (3×), four times (4×) or more greater than the base outer radius 36. The present disclosure, however, is not limited to such an exemplary dimensional relationship between the bearing land 32 and the shaft base 30. For example, in other embodiments, the land outer radius 34 may be less than two times (2×) or greater than five times (5×) the base outer radius 36.

The turbine engine shaft 24 may be configured as a single monolithic body. Alternatively, the turbine engine shaft 24 and, more particularly, its shaft base 30 may include a plurality of interconnected shafts/shaft segments.

The turbine engine rotor 26 may be configured as a bladed rotor. The turbine engine rotor 26 of FIG. 2, for example, includes one or more rotor disks 38A and 38B (generally referred to as "38") and a plurality of rotor blades 40A and 40B (generally referred to as "40"). Each of the rotor disks 38A, 38B is associated with a respective set of the rotor blades 40A, 40B. The rotor blades 40 in each set are arranged circumferentially about and connected to a respective one of the rotor disks 38. The rotor blades 40, for example, may be formed integral with or mechanically fastened, welded, brazed, adhered and/or otherwise attached to the respective rotor disk 38. The first rotor disk 38A is (e.g., directly) connected to the turbine engine shaft 24 and its shaft base 30. The second rotor disk 38B is (e.g., indirectly) connected to the turbine engine shaft 24 and its shaft base 30. The second rotor disk 38B of FIG. 2, for example, is connected to the first rotor disk 38A, which first rotor disk 38A connects the second rotor disk 38B to the shaft base 30.

Each rotor disk 38 is configured with a bore 41 that receives the turbine engine shaft 24 axially therethrough. This rotor disk bore 41 may be sized as small as possible while still providing clearance for the turbine engine shaft 24 and its components (e.g., 30 and/or 31) during turbine engine operation; e.g., enough clearance to avoid interference. For example, the turbine engine rotor 26 and its rotor disk(s) 38 may be configured to facilitate positioning the structure bearing 16 axially forward for rotor dynamic purposes and/or radially outward to accommodate the electric machine system 18 as described below in further detail. The rotor disk bore 41 may also be sized as small as possible to reduce (e.g., minimize) rotor disk weight.

Each rotor disk 38 may include a hub 42, a web 43 and a rotor 44; e.g., a turbine rotor. The hub 42 is disposed at a radial outer end of the respective rotor disk 38. The hub 42 is configured for connecting (e.g., mounting) the respective set of rotor blades 40 to the rotor disk 38. The web 43 is radially between and connected to the hub 42 and the rotor 44. The web 43 extends radially between and to the hub 42 and the rotor 44. The rotor 44 is disposed at (or about) a radial inner end 46 of the respective rotor disk 38. The rotor 44 may have an axial thickness 48 sized greater than an axial thickness 50 of the hub 42 and/or an axial thickness 52 of the web 43. The hub axial thickness 50 may also be sized greater than the web axial thickness 52.

Figure 3:
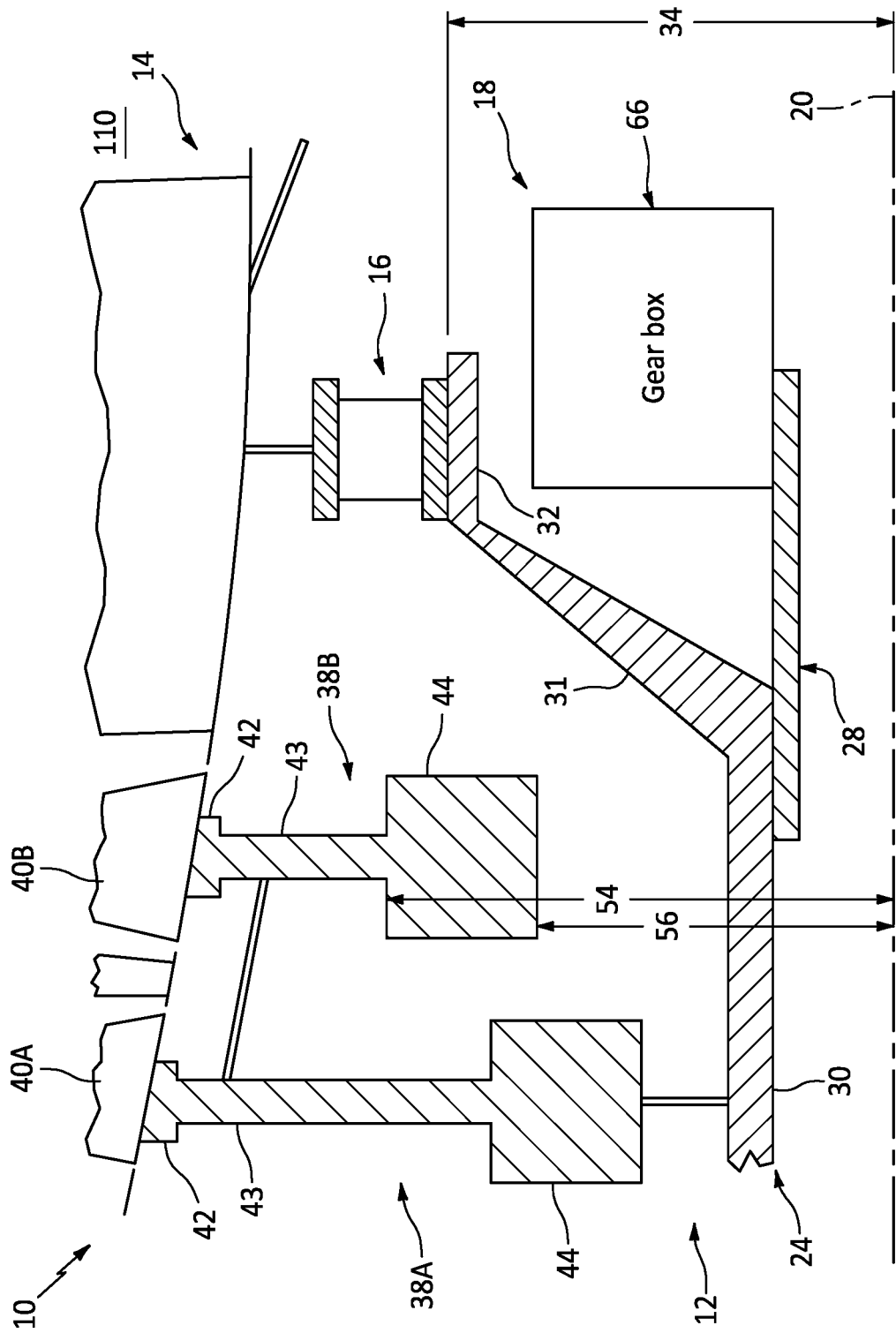
FIGS. 3 and 4 are partial sectional illustrations of portions of the turbine engine assembly provided with various other rotor configurations.

Each rotor 44 has an outer radius 54 measured from the rotational axis 20 to a radial outer end of the respective rotor 44, e.g., at an interface between the rotor 44 and the web 43. The rotor outer radius 54 of at least one (e.g., each) of the rotors 44 may be sized less than the land outer radius 34 such that the bearing land 32 is located radially further from the rotational axis 20 than that rotor 44. The present disclosure, however, is not limited to such an exemplary dimensional relationship between the rotor 44 and the bearing land 32. For example, in other embodiments, the rotor outer radius 54 may be equal to or greater than the land outer radius 34. For example, referring to FIG. 3, the land outer radius 34 may be sized less than the rotor outer radius 54 but greater than an inner radius 56 of the of the respective rotor 44. The present disclosure, however, is not limited to such an exemplary rotor disk configuration. For example, in other embodiments, the rotor 44 and the web 43 may be integrated together or omitted.

Figure 4:
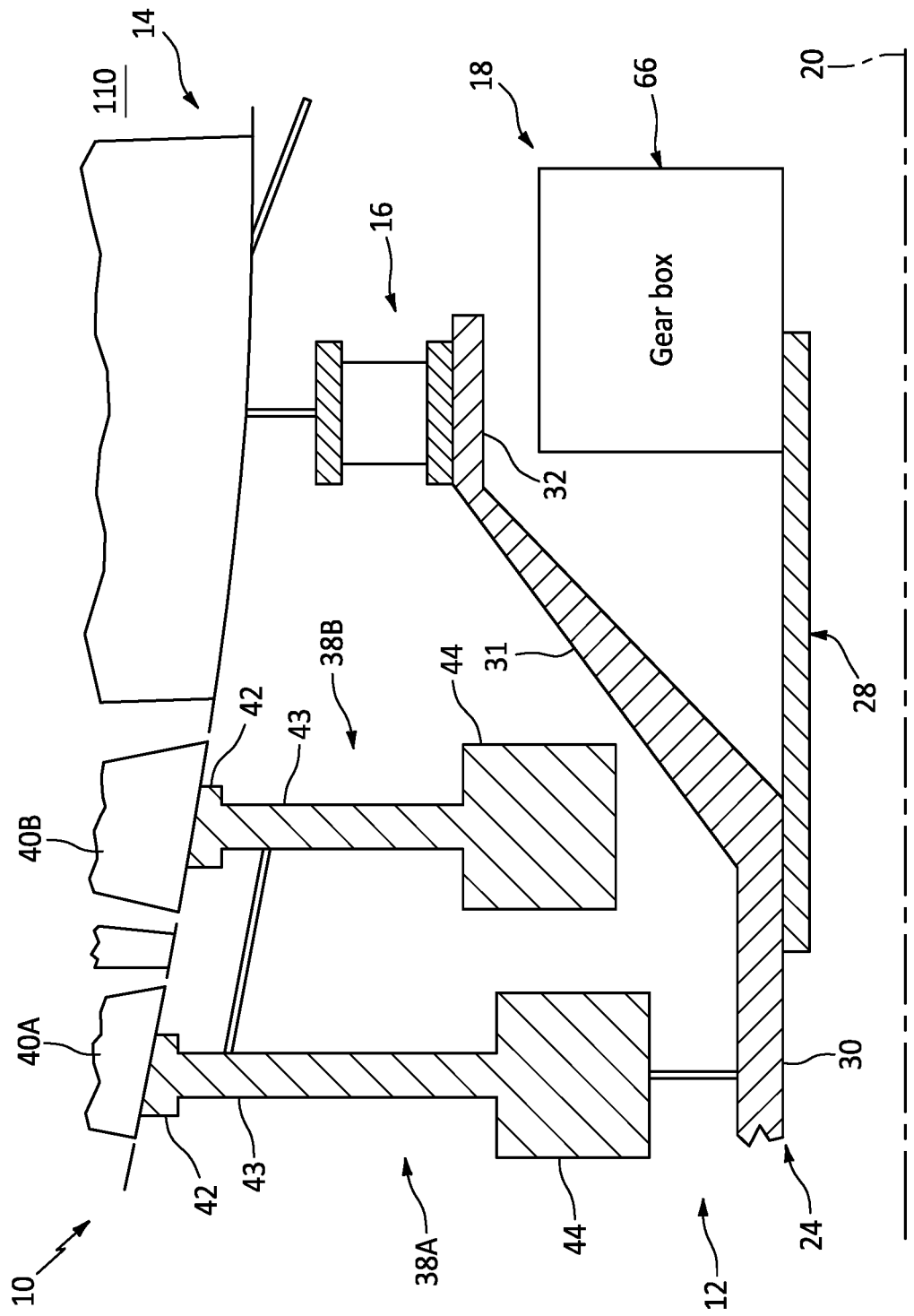

Referring to FIG. 2, each of the rotor disks 38 and its elements 42-44 may be spaced axially in a second direction (e.g., forward; right-to-left along the rotational axis 20 in FIG. 2), which is opposite the first direction, from the shaft extension 31. Each of the rotor disks 38 and its elements 42-44 of FIG. 2, for example, is axially misaligned from the shaft extension 31. None of the rotor disks 38 may thereby axially overlap the shaft extension 31. However, referring to FIG. 4, at least one of the rotor disks 38 and one or more of its elements 42-44 may alternatively axially overlap the shaft extension 31.

The system coupler 28 of FIG. 2 is configured as a coupler shaft. The system coupler 28 may be mechanically attached to the turbine engine shaft 24 by a mechanical coupling; e.g., a spline connection. The present disclosure, however, is not limited to such an exemplary configuration. For example, in other embodiments, the system coupler 28 may be configured as an integral part of the turbine engine shaft 24, or a segment thereof.

The stationary structure 14 may be configured as or otherwise include any stationary (e.g., static, non-rotating) component or assembly of stationary components within the turbine engine. The stationary structure 14, for example, may include a turbine engine case and one or more internal support structures within and connected to the turbine engine case.

The structure bearing 16 may be arranged discrete from the electric machine system 18. The structure bearing 16 of FIG. 2, for example, is arranged outside of and/or spaced from the electric machine system 18. This structure bearing 16, however, may be arranged proximate (e.g., close to) the electric machine system 18. The structure bearing 16 of FIG. 2, for example, is located radially outboard of the electric machine system 18.

The structure bearing 16 may be configured as a rolling element bearing. The structure bearing 16 of FIG. 2, for example, includes a bearing inner race 58, a bearing outer race 60 and a plurality of bearing rolling elements 62. The inner race 58 is connected (e.g., fixedly mounted) to the turbine engine shaft 24 and its bearing land 32. The outer race 60 is connected (e.g., fixedly mounted) to the stationary structure 14. The rolling elements 62 are arranged circumferentially about the rotational axis 20 in an array, and disposed radially between and engaged with the inner race 58 and the outer race 60. With this arrangement, the structure bearing 16 is configured to rotatably mount the rotating structure 12 and its turbine engine shaft 24 to the stationary structure 14.

The electric machine system 18 of FIG. 1 includes an electric machine 64 and a gearbox 66. The electric machine 64 is configurable as an electric motor and/or an electric generator. For example, during a motor mode of operation, the electric machine 64 may operate as the electric motor to convert electricity (e.g., received from a battery and/or another electricity source) into mechanical power. This mechanical power may be utilized for various purposes within the turbine engine such as, for example, rotating the rotating structure 12 during turbine engine startup. During a generator mode of operation, the electric machine 64 may operate as the electric generator to convert mechanical power (e.g., received through the rotating structure 12) into electricity. This electricity may be utilized for various purposes within the turbine engine such as, for example, electrically powering one or more electric components of the turbine engine and/or charging the battery. The electricity may also or alternatively be utilized for various purposes outside of the turbine engine such as, for example, electrically powering one or more electrical components in an aircraft.

The electric machine 64 includes an (e.g., annular) electric machine rotor 68 and an (e.g., annular) electric machine stator 70. The electric machine 64 also includes an (e.g., annular) electric machine case 72 that at least partially or completely houses the machine rotor 68 and/or the machine stator 70. The machine rotor 68 is configured to move relative to (e.g., rotate within or about) the machine stator 70 to convert electricity into mechanical power or convert mechanical power into electricity depending upon the mode of electric machine operation. The machine rotor 68, for example, may be rotatably mounted within the electric machine 64 to a stationary portion of the electric machine 64 (e.g., the machine case 72 and/or the machine stator 70) via one or more internal electric machine bearings 74; e.g., rolling element bearings. The machine stator 70 is connected (e.g., fixedly mounted) to the machine case 72, and the machine case 72 is connected (e.g., fixedly mounted) to the stationary structure 14.

The gearbox 66 is configured to couple the rotating structure 12 with the electric machine 64. The gearbox 66 of FIG. 1, for example, couples the system coupler 28 with the machine rotor 68. Thus, during the motor mode of operation, the electric machine 64 may drive rotation of the rotating structure 12 and its elements 24 and 26 through the gearbox 66. During the power mode of operation, the rotating structure 12 may drive rotation of the machine rotor 68 through the gearbox 66.

The gearbox 66 may be configured as a speed change device; e.g., a speed reduction device when, for example, the machine rotor 68 drives the rotating structure 12. The gearbox 66, for example, may be configured such that the rotating structure 12 and its elements 24 and 26 rotate faster than the machine rotor 68. Alternatively, the gearbox 66 may be configured such that the machine rotor 68 rotates faster than the rotating structure 12 and its elements 24 and 26.

The gearbox 66 of FIG. 1 is disposed within an internal cavity 76 (e.g., a bore or an annulus) of the rotating structure 12 and its bearing land 32. More particularly, the gearbox 66 of FIG. 1 projects axially along the rotational axis 20 into the structure cavity 76. The rotating structure 12 and its bearing land 32 may thereby axially overlap and extend circumferentially about (e.g., circumscribe) the electric machine system 18 and its gearbox 66. The structure bearing 16 mounted to the bearing land 32 may also axially overlap and extend circumferentially about (e.g., circumscribe) the electric machine system 18 and its gearbox 66. With this arrangement, the electric machine system 18 and its gearbox 66 may be partially nested with the rotating structure 12; e.g., disposed further axially (e.g., forward, or aft) in the second direction along the rotational axis 20. This may facilitate provision of a more compact and/or axially shorter turbine engine and reduce an overhung moment load of the electric machine system 18 on the stationary structure 14.

Figure 5:
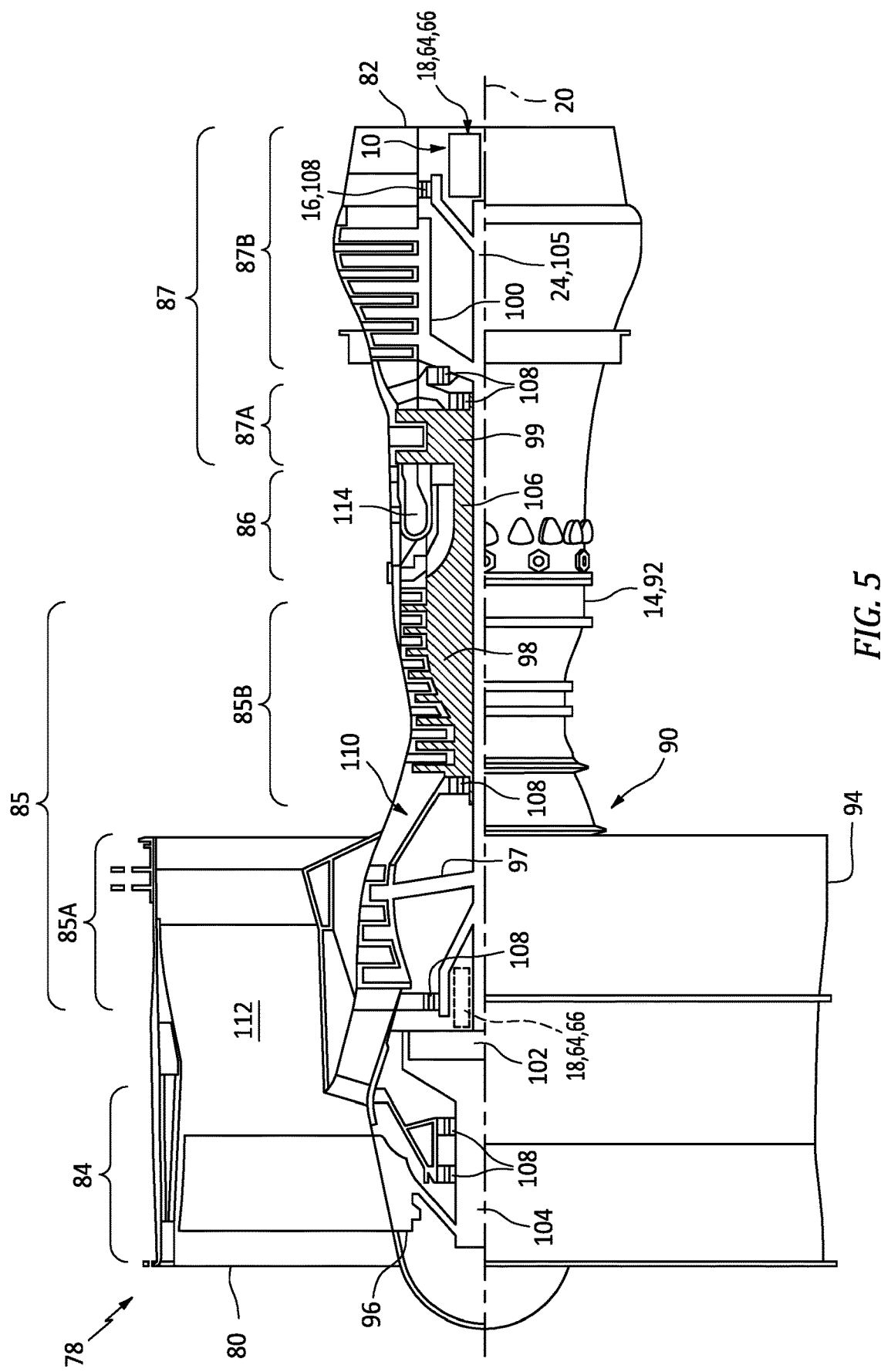
FIG. 5 is a side cutaway illustration of a geared turbofan gas turbine engine.

FIG. 5 illustrates an example of the turbine engine with which the turbine engine assembly 10 may be configured. This turbine engine is configured as a geared, turbofan gas turbine engine 78. This turbine engine 78 extends along the rotational axis 20 between an upstream airflow inlet 80 and a downstream airflow exhaust 82. The turbine engine 78 includes a fan section 84, a compressor section 85, a combustor section 86 and a turbine section 87. The compressor section 85 includes a low pressure compressor (LPC) section 85A and a high pressure compressor (HPC)

section 85B. The turbine section 87 includes a high pressure turbine (HPT) section 87A and a low pressure turbine (LPT) section 87B.

The engine sections 84-87B are arranged sequentially along the rotational axis 20 within an engine housing 90. This engine housing 90 includes an inner case 92 (e.g., a core case) and an outer case 94 (e.g., a fan case). The inner case 92 may house one or more of the engine sections 85A-87B (e.g., an engine core) as well as the electric machine 64. The outer case 94 may house at least the fan section 84.

Each of the engine sections 84, 85A, 85B, 87A and 87B includes a respective rotor 96-100. Each of these rotors 96-100 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 96 is connected to a gear train 102, for example, through a fan shaft 104. The gear train 102 and the LPC rotor 97 are connected to and driven by the LPT rotor 100 through a low speed shaft 105. The HPC rotor 98 is connected to and driven by the HPT rotor 99 through a high speed shaft 106. The shafts 104-106 are rotatably supported by a plurality of bearings 108; e.g., rolling element bearings. Each of these bearings 108 is connected to the engine housing 90 by, for example, an annular support strut.

During operation, air enters the turbine engine 78 through the airflow inlet 80. This air is directed through the fan section 84 and into a core flowpath 110 and a bypass flowpath 112. The core flowpath 110 extends sequentially through the engine sections 85A-87B. The air within the core flowpath 110 may be referred to as "core air". The bypass flowpath 112 extends through a bypass duct, which bypasses the engine core. The air within the bypass flowpath 112 may be referred to as "bypass air".

The core air is compressed by the LPC rotor 97 and the HPC rotor 98 and directed into a combustion chamber 114 of a combustor in the combustor section 86. Fuel is injected into the combustion chamber 114 and mixed with the compressed core air to provide a fuel-air mixture. This fuel air mixture is ignited and combustion products thereof flow through and sequentially cause the HPT rotor 99 and the LPT rotor 100 to rotate. The rotation of the HPT rotor 99 and the LPT rotor 100 respectively drive rotation of the HPC rotor 98 and the LPC rotor 97 and, thus, compression of the air received from a core airflow inlet. The rotation of the LPT rotor 100 also drives rotation of the fan rotor 96, which propels bypass air through and out of the bypass flowpath 112. The propulsion of the bypass air may account for a majority of thrust generated by the turbine engine 78, e.g., more than seventy-five percent (75%) of engine thrust. The turbine engine of the present disclosure, however, is not limited to the foregoing exemplary thrust ratio.

The turbine engine assembly 10 may be configured at various different locations within the turbine engine 78. For example, the turbine engine assembly 10 and its electric machine system 18 may be housed within the engine housing 90 and, more particularly, the inner case 92. The stationary structure 14, for example, may be or otherwise include the inner case 92. The electric machine system 18 may also be disposed radially inboard of the core flowpath 110, where the core flowpath 110 axially overlaps and extends circumferentially about (e.g., completely around, circumscribes) the electric machine system 18. For example, the electric machine system 18 may be arranged with/axially aligned with the turbine section 87, where the turbine engine shaft 24 may be one of the shafts 104-106 (e.g., 105) and the structure bearing 16 may be a respective one of the bearings 108 supporting the respective shaft. The present disclosure, however, is not limited to such an exemplary arrangement. For example, in other embodiments, the turbine engine assembly 10 and its electric machine system 18 may also or alternatively be arranged with/aligned with another one or more sections 84, 85 and/or 86 of the turbine engine 78.

The turbine engine assembly 10 of FIG. 1 is described above as being paired with the electric machine system 18. However, in other embodiments, the electric machine 64 may be omitted (or arranged discrete from the gearbox 66) and the gearbox 66 may be coupled with one or more other rotating elements/structures within the turbine engine 78 of FIG. 5. For example, the gearbox 66 may alternatively be configured as the geartrain 102 and the turbine engine assembly 10 may be arranged with/axially aligned with the compressor section 85. In still other embodiments, another component of the turbine engine 78 other than the electric machine system 18 and/or the gearbox 66 may also or alternatively be nested within the structure cavity 76.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a direct drive turbine engine configured without a gear train. The turbine engine assembly 10 may be included in a turbine engine configured with a single spool, with two spools (e.g., see FIG. 5), or with more than two spools. The turbine engine may be configured as a turbofan engine, a turbojet engine, a turboprop engine, a turboshaft engine, a propfan engine, a pusher fan engine or any other type of turbine engine. The turbine engine may alternative be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
    a rotating structure configured to rotate about a rotational axis, the rotating structure including a shaft and a bladed rotor connected to the shaft;
    a stationary structure circumscribing the rotating structure;
    a bearing rotatably mounting the shaft to the stationary structure; and
    a gearbox disposed radially inboard of the bearing;
    the shaft including a base, an extensioin and a land,
    the extension projecting radially in an outward direction and axially in a first direction out from the base to the land; and the bearing rotatably mounting the land to the stationary structure; and the land axially overlapping, spaced from and extending circumferentially about the gearbox.

2. The assembly of claim 1, wherein the bearing axially overlaps and extends circumferentially around the gearbox.

3. The assembly of claim 1, wherein the gearbox is disposed within a cavity of the shaft.

4. The assembly of claim 1, wherein the extension is configured as a conical section of the shaft.

5. The assembly of claim 1, further comprising:
an electric machine including a rotor and a stator;
the gearbox coupling the rotating structure to the rotor.

6. The assembly of claim 5, wherein the electric machine is configured as a motor during at least one mode of operation.

7. The assembly of claim 5, wherein the electric machine is configured as a generator during at least one mode of operation.

8. The assembly of claim 5, further comprising:
a compressor section, a combustor section, a turbine section and a flowpath extending sequentially through the compressor section, the combustor section and the turbine section;
the gearbox and the electric machine radially inboard of the flowpath.

9. The assembly of claim 1, wherein
the bladed rotor includes a rotor disk and a plurality or rotor blades arranged circumferentially about and connected to the rotor disk; and
the rotor disk is connected to the shaft.

10. The assembly of claim 1, wherein the bladed rotor is configured as a turbine rotor.

11. The assembly of claim 10, wherein
the rotating structure further includes a second bladed rotor connected to the shaft; and
the second bladed rotor is configured as a compressor rotor.

12. An assembly for a turbine engine, comprising:
a rotating structure configured to rotate about a rotational axis, the rotating structure including a shaft and a bladed rotor connected to the shaft;
a stationary structure circumscribing the rotating structure;
a bearing rotatably mounting the shaft to the stationary structure; and
a gearbox disposed radially inboard of the bearing;
the shaft including a base, an extensioin and a land;
the extension projecting radially in an outward direction and axially in a first direction out form the base to the land;
the bearing rotatably mounting the land to the stationary structure; and the gearbox spaced from the land;
wherein the first direction is an axially aft direction.

13. The assembly of claim 12, further comprising:
an electric machine including a rotor and a stator;
the gearbox coupling the rotating structure to the rotor.

14. The assembly of claim 13, wherein the electric machine is configured as a motor during at least one mode of operation.

15. The assembly of claim 13, wherein the electric machine is configured as a generator during at least one mode of operation.

16. The assembly of claim 13, further comprising:
a compressor section, a combustor section, a turbine section and a flowpath extending sequentially through the compressor section, the combustor section and the turbine section;
the gearbox and the electric machine radially inboard of the flowpath.

17. The assembly of claim 12, wherein
the bladed rotor includes a rotor disk and a plurality or rotor blades arranged circumferentially about and connected to the rotor disk; and
the rotor disk is connected to the shaft.

18. The assembly of claim 12, wherein the bladed rotor is configured as a turbine rotor.

19. An assembly for a turbine engine, comprising:
a rotating structure configured to rotate about a rotational axis, the rotating structure including a shaft and a bladed rotor connected to the shaft;
a stationary structure circumscribing the rotating structure;
a bearing rotatably mounting the shaft to the stationary structure; and
an electric machine system disposed within a cavity of the shaft, the electric machine system including a rotor and a stator;
the electric machine system further including a gearbox and an electric machine;
the gearbox disposed within the cavity of the shaft; and
the electric machine including the rotor and the stator.

20. The assembly of claim 19, wherein the gearbox couples the shaft to the rotor.

* * * * *